No. 848,221. PATENTED MAR. 26, 1907.
J. C. BARCLAY.
TELEGRAPHY.
APPLICATION FILED MAR. 19, 1906.
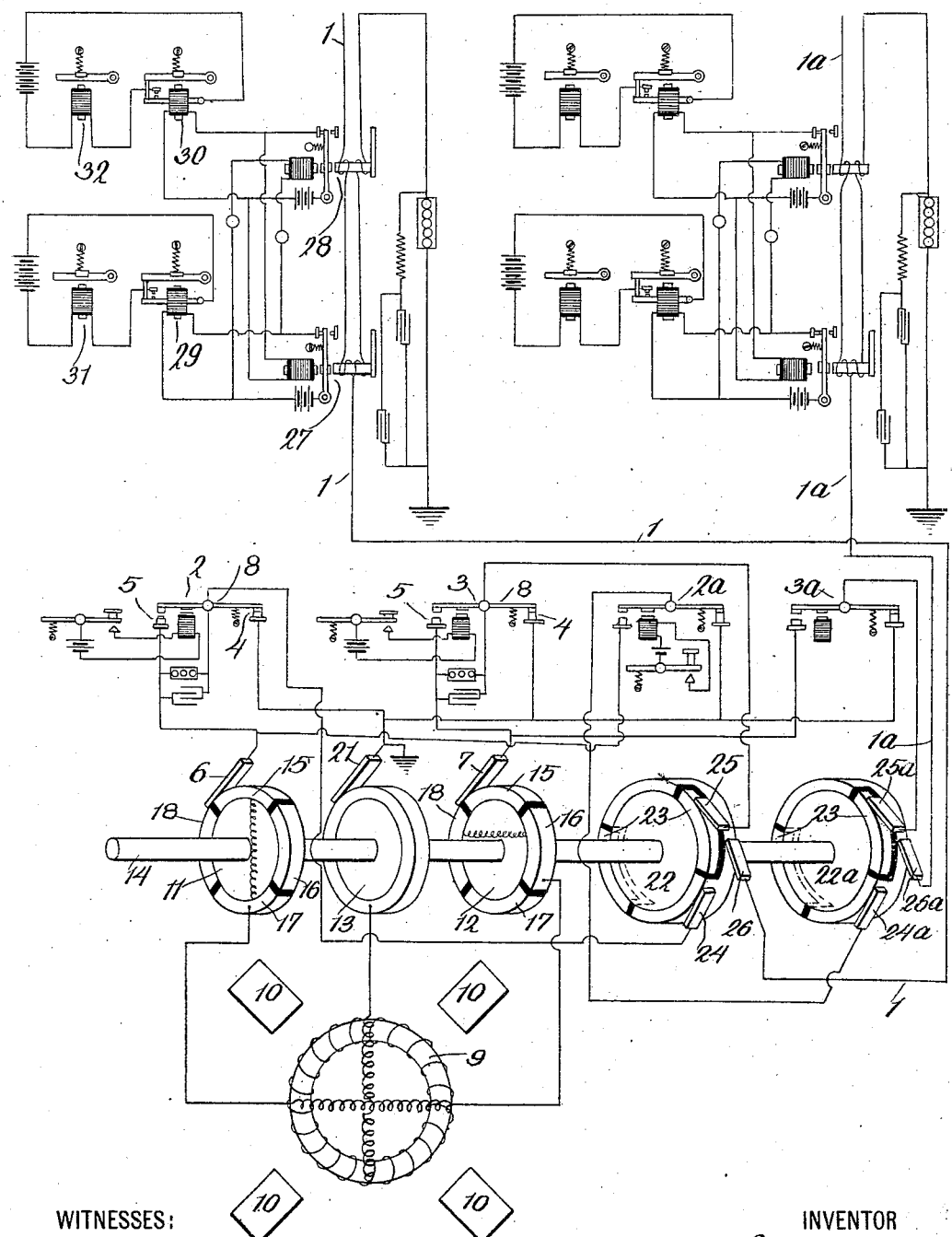
WITNESSES:
INVENTOR
John C. Barclay
BY
H. M. Marble
ATTORNEY

UNITED STATES PATENT OFFICE.

JOHN C. BARCLAY, OF NEW YORK, N. Y.

TELEGRAPHY.

No. 848,221.   Specification of Letters Patent.   Patented March 26, 1907.

Application filed March 19, 1906. Serial No. 306,792.

*To all whom it may concern:*

Be it known that I, JOHN C. BARCLAY, a citizen of the United States, residing at New York, in the county of New York and State of New York, have invented certain new and useful Improvements in Telegraphy; and I do hereby declare the following to be a full, clear, and exact description of the same, such as will enable others skilled in the art to which it appertains to make and use the same.

My invention relates to quadruplex and diplex telegraphs, and particularly to that class thereof wherein two messages in the same direction are transmitted by current pulses of different polarity. In such systems certain advantages are gained by operating the system, or more properly supplying current to the system, by means of an alternating-current generator, suitable distributing means being employed, so that all of the positive pulses from such generator pass to one of the two transmitters only and all of the negative pulses from such generator pass to the other of such two transmitters only; but heretofore where a plurality of diplex or quadruplex lines were to be operated it has been found impracticable to supply current to all or a plurality of such lines from a single alternating-current generator, owing to occasional mutilation of signals in one circuit or the transmission of false signals therein, due to formation of a derived circuit upon simultaneous operation of the other transmitter of the same circuit and of the transmitter of another circuit from the same generator, whereby a current pulse may be sent through one of the lines when the corresponding transmitter is open. The inconvenience and expense of providing a separate generator for each line, as heretofore required to avoid the formation of false derived circuits, as mentioned, has militated greatly against the adoption of diplex and quadruplex systems of the alternating-current type.

My invention consists in means whereby the formation of such derived circuits and consequent interference with transmission in one line by transmission in another line connected to the same generator is obviated and whereby any desired number of lines may be operated from the same generator without interference with messages transmitted through any of such circuits by transmission in any of the other circuits.

The object of my invention is to supply current for any desired number of diplex or quadruplex lines of the class described from a common generator, and to do this by simple, inexpensive, and entirely reliable means.

In the accompanying drawing I illustrate diagrammatically one form of apparatus and one arrangement of circuits whereby such object is accomplished. Said drawing shows transmitting and receiving instruments at one end of each of two quadruplex telegraph-lines, together with a single alternating-current generator and means whereby current is supplied to both said lines from said common generator entirely without interference such as mentioned.

In the said drawing, two line-wires 1 1ª are shown. The transmitting and receiving apparatus for these lines are identical, and therefore the said apparatus of only one of the lines need be described, the instrument and apparatus for line 1ª being designated by the same reference characters used for corresponding parts of line 1 with letter "a" added.

For line 1 there are transmitters 2 and 3 of ordinary type, each controlled by an appropriate hand-key and local circuit. The particular transmitter, indicated are of the walking-beam type, the back contact-stop 4 of each transmitter being connected to a ground-brush of the generator, as hereinafter described, and thence to ground, the front contact-stop 5 of one transmitter being connected to brush 6 of the transmitting-generator and the front contact-stop of the other transmitter being connected to brush 7 of such generator. The armatures 8 of the transmitters are connected to the line conductor through commutating devices operated in synchronism with the generator, as hereinafter described.

9 designates the armature of an alternating-current transmitter, 10 the field-magnet thereof, and 11, 12, and 13 designate distributing-rings mounted on a shaft 14, which in practice rotates in synchronism with the armature 9 and may be understood to be the armature-shaft, although for simplicity and clearness of illustration the diagram does not show a driving connection between the armature and said shaft. I have not indicated means for driving the armature 9 and shaft 14, as any means suitable for such purpose may be employed; neither have I indicated any particular type of field-winding, and it will be understood that any suitable winding may be employed for the winding of the field-coils or for the armature as well. The particular dynamo indicated is a four-pole dynamo; but this is immaterial, all that is necessary being that there shall be proper correspondence between the poles of the field-magnets and the segments on the selecting-rings and commutators.

The generator having four poles, distributer-rings 11 and 12 are each divided into four segments 15, 16, 17, and 18, of which 15 and 17 of ring 11 are connected electrically and 16 and 18 of ring 12 are connected electrically, segments 16 and 18 of ring 11 and segments 15 and 17 of ring 12 being out of electrical connection and therefore idle.

I have shown brushes 6 and 7 for rings 11 and 12, respectively, brush 6 passing into contact with a live section of its distributing-ring 11 as brush 7 of ring 12 passes out of contact with a live section and into contact with a dead section of its ring 12. The ground-ring 13 is not divided into segments, but is connected to "ground" (a term which I employ generically for all forms of return) by brush 21. The armature-coils of the generator are connected to the "live" segments 15 and 17 of ring 11 to the live segments 16 and 18 of ring 12 and to the ground-ring 13, so that when any one of the transmitters has its front contact closed a circuit is completed from ground through ring 13, the generator-armature, the distributing-ring corresponding to that transmitter, and thence (as will be shown hereafter) through the appropriate commutating device to the line and thence to ground.

For convenience of description it may be assumed that transmitter 2 controls only positive pulses and transmitter 3 controls only negative pulses. It will be seen that transmitter 2 is connected, through the distributing-ring 11, to the generator only when that generator is producing a positive pulse and that transmitter 3 is connected, through the distributing-ring 12, to the generator only when that generator is producing a negative pulse, and that during each period of connection of a transmitter to its generator the current (supposing the line-circuit to be complete) rises gradually from zero to a maximum and then falls to zero gradually, this being the ideal condition for reducing to a minimum choking in the telegraph instruments and inductive interference with other lines.

As stated above, heretofore it has not been practicable to operate more than one circuit from a single generator in systems of the class described owing to mutilation of signals or mutual interference between signals in the different circuits. That such is the case may be seen from the drawing, in which I have shown two line conductors 1 and 1ª, the circuits and instruments of circuit 1ª being identical with those of circuit 1 and being designated by the same reference characters with the letter "a" added to each for convenience in distinction. Supposing, therefore, that circuits 1 and 1ª both take current from the same generator, as is the case with the connections shown, and that the commutating devices 22 and 22ª are omitted, in which case the armatures 8 of transmitters 2 and 3 will be connected directly to line 1, and the armatures 8ª of transmitters 2ª and 3ª will be connected directly to the line 1ª, and supposing that the front contact 5 of transmitter 2 is open and that the corresponding front contacts of transmitters 3, 2ª, and 3ª are all closed, as may well happen at one time, then there is a derived circuit from brush 6 through transmitter 2ª to line 1ª, thence through transmitter 3ª, brush 7, and transmitter 3 to line 1, the effect of which derived circuit is the same as though transmitter 2 were closed, which is not the case. To obviate this mutual interference between the transmitters of different lines operated from the same generator, I provide commutating devices 22, 22ª, and so on, one for each line operated from the common generator driven in synchronism with the generator-armature and distributing-rings 11, 12, and 13 and preferably on the same shaft. In the simple form shown in the drawings each such commutating device comprises a disk having insulated or dead segments 23 corresponding to the dead segments of the distributing-rings 11 and 12, the remainder of the surface of such disk being conductive, and I provide in connection with each such disk a brush 24, to which the armature of transmitter 2 is connected, a brush 25, to which the armature of transmitter 3 is connected, (said brushes arranged to track over the live and dead sections of the disk alternately and spaced apart by an angle corresponding to the arc of such dead sections,) and a brush 26, connected to the line and tracking only on the live portion of the disk. It will be seen that when these commutating devices are used a transmitter 3 is never connected to the line when the corresponding transmitter 2 is connected to the line, and vice versa, and therefore the possibility of false signals or mutilation of signals in the manner above explained is entirely avoided, thus making possible the operation of any desired number of circuits from the same generator.

The particular receiving apparatus I have shown in the drawing is that commonly employed in systems of the class described, comprising line-relays 27 and 28, one polarized to respond only to positive pulses and the other to respond only to negative pulses, repeating-relays 29 and 30 for said line-relays, and sounders 31 and 32. The line-relays are differentially wound for the line 1 and artificial line 1', as is customary in duplex and quadruplex systems.

The operation of the apparatus is as follows: The generator, distributing, and commutating devices being in full operation, brush 6 connects the generator to stop 5 of transmitter 2, while a positive pulse produced by said generator rises and then falls, brush 25 being at such time on a dead section of commutating-disk 22 and brush 24 on a live section thereof, so that armature 8 of transmitter 2 is connected to the line and armature 8 of transmitter 3 is disconnected from the line, and the same is true with respect to transmitters 2ª 3ª and line 1ª. When the positive pulse has nearly died down, the transmitter 2 is disconnected from the generator and line and at the beginning of the next negative pulse stop 5 of transmitter 3 is connected to the generator through brush 7, and the armature 8 of transmitter 3 is connected to the line through brush 25. The pulses succeed each other with great rapidity, so that even a dot of the Morse code will include enough of the corresponding pulses (positive or negative, as the case may be) to cause the operation of the correspondingly-polarized receiving-relay at the distant station.

What I claim is—

1. In a telegraph system, the combination with a plurality of transmitting sets for different lines, each set comprising two transmitters, for currents of different polarity respectively, means for supplying an alternating current, and distributing means controlling the supply of current therefrom to said transmitters, of means for preventing mutual interference with transmission by one of said transmitting sets through simultaneous operation of instruments of another of said transmitting sets.

2. In a telegraph system, the combination with a plurality of transmitting sets for different lines, each set comprising two transmitters, for currents of different polarity respectively, an alternating-current generator, and distributing means controlling the supply of current therefrom to said transmitters, of means for preventing mutual interference with transmission by one of said transmitting sets through simultaneous operation of instruments of another of said transmitting sets.

3. In a telegraph system, the combination with a plurality of transmitting sets for different lines, each set comprising two transmitters, for currents of different polarity respectively, means for supplying an alternating current, and distributing means controlling the supply of current therefrom to said transmitters, of commutating means for each set of such transmitters, operated synchronously with the distributing means, and comprising means which disconnects each transmitter of the corresponding set from its line during transmission through such line of current of polarity opposite to that controlled by the transmitter so disconnected.

4. In a telegraph system, the combination with a plurality of transmitting sets for different lines, each set comprising two transmitters, for currents of different polarity respectively, an alternating-current generator, and distributing means controlling the supply of current therefrom to said transmitters, of commutating means for each set of such transmitters, operated synchronously with the generator and comprising means which disconnects each transmitter of the corresponding set from its line during transmission through such line of current of polarity opposite to that controlled by the transmitter so disconnected.

5. In a telegraph system, the combination with a plurality of transmitting sets for different lines, each set comprising two transmitters, for currents of different polarity respectively, of an alternating-current generator, distributing means controlling the supply of current therefrom to said transmitters, and commutating means for each set of such transmitters operated synchronously.

6. In a telegraph system, transmitting means comprising in combination an alternating-current generator, distributing means operated synchronously therewith and arranged to direct positive pulses through a circuit of one of two transmitters and negative pulses through a circuit of the other of such transmitters, and commutating means likewise operated synchronously with the generator and comprising means for disconnecting each of such transmitters from the line during the production by such generator of a current pulse of the direction opposite to that to which the transmitter so disconnected corresponds.

In testimony whereof I affix my signature in the presence of two witnesses.

JOHN C. BARCLAY.

Witnesses:
H. M. MARBLE,
C. A. VAN BRUNT.